US008861866B2

(12) United States Patent
Zhang et al.

(10) Patent No.: US 8,861,866 B2
(45) Date of Patent: Oct. 14, 2014

(54) IDENTIFYING A STYLE OF CLOTHING BASED ON AN ASCERTAINED FEATURE

(75) Inventors: Tong Zhang, San Jose, CA (US); Daniel R. Tretter, San Jose, CA (US); Qian Lin, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 219 days.

(21) Appl. No.: 13/528,743

(22) Filed: Jun. 20, 2012

(65) Prior Publication Data

US 2013/0343615 A1   Dec. 26, 2013

(51) Int. Cl.
 G06K 9/00 (2006.01)
 G06K 9/66 (2006.01)
 G06K 9/46 (2006.01)
(52) U.S. Cl.
 USPC .......................... 382/203; 382/111; 382/190
(58) Field of Classification Search
 CPC ....... G06K 9/62; G06K 9/6227; G06T 7/0079
 USPC .......................................... 382/173, 224, 111
 See application file for complete search history.

(56) References Cited

U.S. PATENT DOCUMENTS

| 7,154,529 | B2 |  | 12/2006 | Hoke et al. |
| 7,324,668 | B2 | * | 1/2008 | Rubinstenn et al. .......... 382/118 |
| 7,437,344 | B2 | * | 10/2008 | Peyrelevade ..................... 706/62 |
| 7,953,648 | B2 |  | 5/2011 | Vock |
| 8,386,486 | B2 | * | 2/2013 | Zhang et al. .................. 707/737 |
| 2004/0212674 | A1 |  | 10/2004 | Massey |
| 2006/0178904 | A1 |  | 8/2006 | Aghassian et al. |
| 2008/0082426 | A1 | * | 4/2008 | Gokturk et al. .................. 705/27 |
| 2011/0016001 | A1 | * | 1/2011 | Schieffelin ................. 705/14.66 |
| 2012/0140987 | A1 | * | 6/2012 | Singh et al. .................... 382/103 |
| 2013/0046637 | A1 | * | 2/2013 | Slutsky et al. ............. 705/14.66 |
| 2013/0066750 | A1 | * | 3/2013 | Siddique et al. ............. 705/27.2 |

FOREIGN PATENT DOCUMENTS

| KR | 20080039609 | 5/2008 |
| TW | 200931332 | 7/2009 |

OTHER PUBLICATIONS

Wei Zhang, Takashi Matsumoto, Juan Liu, Maurice Chu, and Bo Begole. 2008. "An intelligent fitting room using multi-camera perception." In Proceedings of the 13th international conference on Intelligent user interfaces (IUI '08). ACM, New York, NY, USA, 60-69.*
Ching-I Cheng; Liu, D.S.-M., "An intelligent clothes search system based on fashion styles," Machine Learning and Cybernetics, 2008 International Conference on , vol. 3, No., pp. 1592,1597, Jul. 12-15, 2008.*
X. Chao, et.al, "A Framework for Robust Feature Selection for Real-time Fashion Style Recommendation" IMCE'09, Oct. 23, 2009. Beijing, China.Copyright 2009, 7 pages.
Zhang, et.al, "Clothing-Based Person Clustering in Family Photos", proceedings of the 2010 IEEE 17 Intl Conf. on Image Processing, Sep. 26-29, 2010, Hong Kong, 4 pages.

* cited by examiner

Primary Examiner — Utpal Shah (57) ABSTRACT

Examples disclose a method executed on a computing device to locate a clothing region within an image to segment into a region of related clothing. Further, the examples provide detecting a feature of the related clothing. Additionally, the examples also disclose determining a style of the related clothing in the region based on the detection of the feature.

17 Claims, 5 Drawing Sheets

IDENTIFYING A STYLE OF CLOTHING BASED ON AN ASCERTAINED FEATURE

BACKGROUND

Shopping is an activity of selecting products for purchase. For some individuals, this task may be considered relaxing, but for others shopping may be daunting and cumbersome. Improving the shopping experience may accommodate those fashion challenged individuals and may also increase economic activity.

BRIEF DESCRIPTION OF THE DRAWINGS

In the accompanying drawings, like numerals refer to like components or blocks. The following detailed description references the drawings, wherein.

DETAILED DESCRIPTION

Providing clothing and/or accessory recommendations, individuals may have a satisfying shopping experience. One solution presents clothing recommendations based on shopping history. In this solution, an individual may shop online at a specific merchant and the clothing recommendations which are computer-automated may include clothing items from that specific merchant. However, this solution may present inadequate recommendations as the solution may not be personalized. For example, the computer may be a public computer and open to several persons shopping online. In a further example, a person may buy gifts from a particular merchant, thus the clothing recommendations would not be applicable. Further, the clothing recommendation may not be based on the person's style, thus the clothing recommendations may not be applicable.

In another solution, clothing is recommended based on the similarity to the clothing analyzed. In this solution, a region of interest is captured and based on features in the region of interest, similar clothing is recommended. However, this solution does not partition the region of interest into a region of related clothing nor are the recommendations based on the person's style in the image. For example, the region of interest may capture a red business shirt and black pants, thus the recommendations may include a red t-shirt and/or red pants. This may become cumbersome to view the clothing recommendations as these may not be style-based. Additionally, both of these solutions do not provide additional customization of recommendations based on demographics of a person in the images.

To address these issues, examples disclosed herein provide a computing device with a segment module to obtain a region of related clothing within an image to detect a feature of the related clothing. Obtaining a region of related clothing enables clothing pieces to be distinguished from one another. This also allows regions of similar clothing to be grouped together. For example, a shirt may be distinguished from pants. Further, this enables the related clothing of one person to be distinguished from an area of clothing of several people.

Additionally, examples disclosed herein also provide a processor to analyze the feature of the related clothing to identify a style of the related clothing based on the feature. Identifying the style of the related clothing enables recommendations to be personalized based on the style.

In another embodiment the processor further obtains a clothing recommendation based on the style of the related clothing. Obtaining the clothing recommendation based on the style of clothing provides a level of customization to help an individual identify articles of clothing without the aggravation of shopping. In this embodiment, the clothing recommendation serves as a fashion stylist to help individuals who may be fashion challenged while also providing helpful suggestions.

In a further embodiment, a recognition module identifies a person in the image and collects demographic data of the person. The demographic data may be used to obtain the clothing recommendation. Identifying the person in the image and collecting demographic data to obtain the clothing recommendation provides additional personalization and customization of the recommendation. This further enables appropriate recommendations to create a more efficient shopping experience for the individual. For example, the recommendations to an older person may be different than recommendations to a child.

In summary, examples disclosed herein provide a more personalized experience for individuals to obtain a clothing recommendation. Further, utilizing demographic data enables appropriate recommendations, thus creating a more efficient shopping experience.

Figure 1:
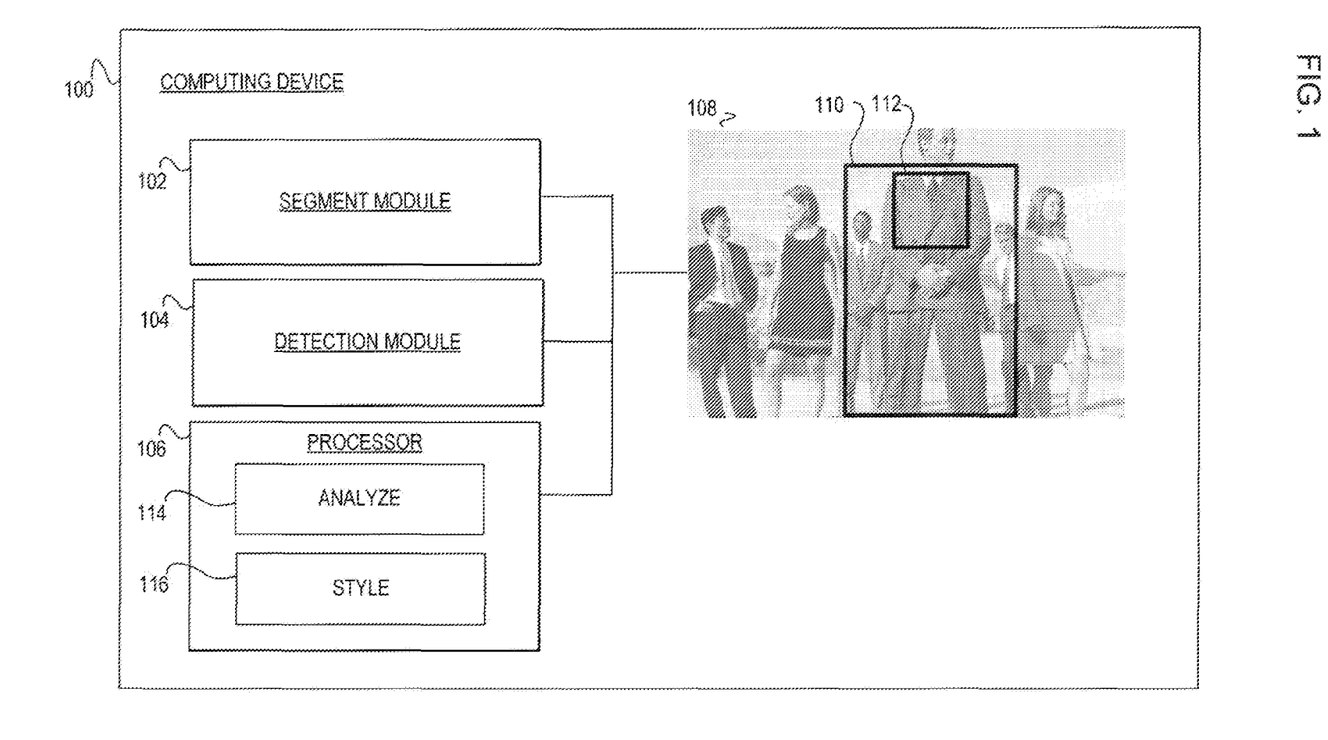
FIG. 1 is a block diagram of an example display on a computing device including a segment module to obtain a region of clothing within an image, a detection module to detect a feature of the clothing in the image, and a processor to analyze the feature to identify a style of the clothing.

Referring now to the drawings, FIG. 1 is a block diagram of an example computing device 100 to locate a clothing region 110 within an image 108 and including a segment module 102 to obtain a region of related clothing 112. A detection module 104 detects a feature of the related clothing 112 in the image 108. A processor 106 to analyze the feature of the related clothing 112 in the image 108 at module 114 to determine a style 116 of the related clothing 112. Embodiments of the computing device 100 include a client device, personal computer, desktop computer, laptop, a mobile device, or other computing device suitable to include components 102, 104, and 106.

The image 108 includes the region of clothing 110 and the region of the related clothing 112. The image 108 is considered an artifact that depicts or records visual perception of one or more persons wearing clothing. In one embodiment, the image 108 may be included as part of an image collection (i.e., two or more images). In this embodiment, a person within the image collection may have on more than one outfit, thus the each clothing region 110 in the images 108 may be grouped together according to the regions of the related clothing 112. Embodiments of the image 108 include a media object, photograph, video, or other visual depiction that may include a region of clothing 110 and related clothing 112.

The clothing region 110 within the image 108 includes the region of related clothing 112. The clothing region 110 is the area within the image 108 that includes an area of the outfits worn by one or more person's bodies. In one embodiment, the computing device 100 may scan the image 108 for a person by face detection and thus once determining there is a person in the image, the clothing region 110 may be located as below the person's face. Although FIG. 1 depicts the clothing region 110 as including two or more suits, embodiments should not be limited as this was done for illustration purposes. For example, the clothing region 110 may include the two or more suits and dresses worn by the persons in the image 108.

The region of related clothing 112 functions as an area within the clothing region 110 in the image 108 comprising the clothing worn by the person in the image 108. Since the person wears an article of clothing of similar texture, color, etc., the region of the related clothing 112 may be grouped according to these similarities. The similarities may include color, texture, and/or type of clothing. This enables the same piece of clothing to be grouped together in the region of related clothing 112 even though there may be irregularities and/or multiple views. The region of related clothing 112 may be smaller in size than the clothing region 110 as it may be considered a subset of the clothing region 110. For example, the clothing region 110 may be expanded to include all clothing within the image 108 while the region of the related clothing 112 pertains to a piece of clothing (i.e., the suit jacket) or the outfit worn by the person.

The segment module 102 partitions clothing region 110 into the similar piece of clothing to obtain the region of related clothing 112 within the image 108. For example, the region of the related clothing 112 is partitioned from the clothing region 110 and may include the suit jacket, the pants, the collared shirt, and/or the tie. Although FIG. 1 depicts the region of the related clothing 112 as including the tie and jacket, embodiments should not be limited as this was done for illustration purposes. For example, the region of the related clothing 112 may include the pants and/or jacket worn by the person in the image 108. In another embodiment, the segment module 102 assigns a pixel to the region or related clothing 112 and the processor 106 analyzes the pixel to determine the feature of the related clothing region 112. Embodiments of the segment module 102 include an instruction, process, operation, logic, algorithm, technique, logical function, firmware and/or software the computing device 100 may fetch, decode, and/or execute to partition the clothing region 110 into the region of the related clothing 112.

The detection module 104 detects a feature within the region of related clothing 112. The feature may include an attribute and/or property of the related clothing 112 in the image 108. The feature may include color, texture, sleeves, collar, length, neckline, pattern, buttons, or other type of attributes to identify the style 116 of clothing. For example, FIG. 1 illustrates several persons wearing various clothing, the clothing region 110 is detected from the two persons near the center of the image 108, thus the region of related clothing 112 may include features such as pinstripes, a collar on the shirt, buttons on the jacket, a tie, etc. One or more of these features detected by 104 indicates a business style 116 of clothing. Embodiments of the detection module 104 include an instruction, process, operation, logic, algorithm, technique, logical function, firmware and/or software the computing device 100 may fetch, decode, and/or execute to detect the feature of the region of related clothing 112.

The processor 106 analyzes the feature of the region of related clothing 112 at module 114 to determine the style 116 of the related clothing 112. In one embodiment, the processor 106 detects the person within an image with facial recognition technology to determine the style 116 worn by that person. This is explained in detail in the next figure. The processor 106 is the hardware within the computing device 100 which carries out the instructions of computer programs and/or software by performing the basic operations of the device 100. Embodiments of the processor 102 include a microchip, chipset, electronic circuit, microprocessor, semiconductor, microcontroller, central processing unit (CPU), graphics processing unit (GPU), visual processing unit (VPU), or other programmable device capable of analyzing the feature of the related clothing at module 114 to determine the style 116 of the related clothing 112.

The analyze module 114 within the processor 106 analyzes the feature of the related clothing 112 to identify the style 116. Embodiments of the analyze module 114 includes an instruction, process, operation, logic, algorithm, technique, logical function, firmware and/or software the computing device 100 may fetch, decode, and/or execute to analyze the feature of the related clothing 112 to determine the style 116.

The style 116 is a type of clothing and consists of a combination of one or more features detected by module 104. Detecting the feature at module 104, the style 116 may be determined, thus the style 116 is based on the feature detected at module 104. For example, a tie may indicate business style 116 of clothing, while a t-shirt may indicate a casual style 116 of clothing. The style 116 of clothing is expression of fashion worn by a person. Embodiments of the style 116 include business, casual, athletic, or other attire describing a type of style 116 of clothing.

Figure 2:
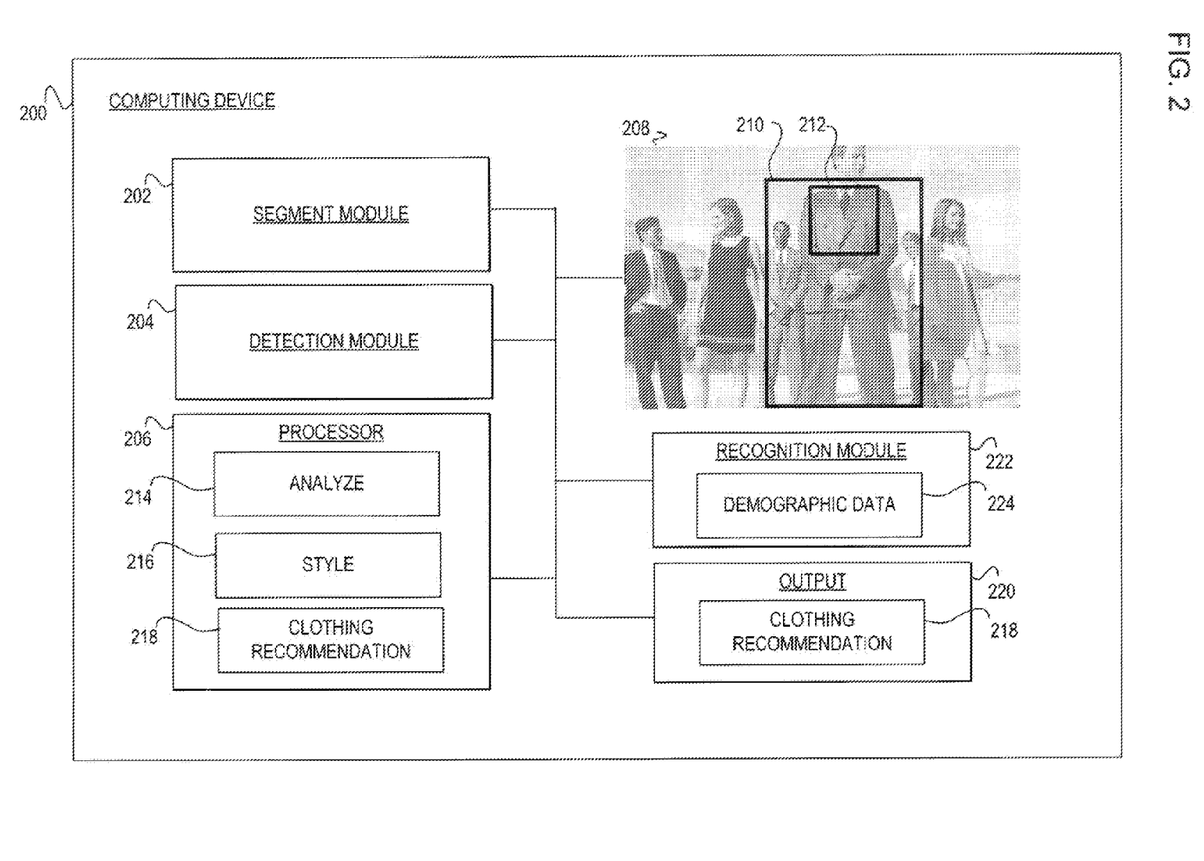
FIG. 2 is a block diagram of an example computing device including a segment module to obtain a region of clothing within an image, a detection module to detect a feature of the clothing in the image, a processor to analyze the feature to identify a style of the clothing, a recognition module to collect demographic data of the image, and an output of a clothing recommendation.

FIG. 2 is a block diagram of an example computing device 200 including a segment module 202 to obtain a region of related clothing 212 within a clothing region 210 in an image 208, a detection module 204 to detect a feature of the related clothing 212, a processor 206 to analyze the feature of the related clothing 212 to identify a style 216, a recognition module 222 to collect demographic data 224 of the image 108, and an output module 220 to output a clothing recommendation 218. The computing device 200 may be similar in structure and functionality to the computing device 100 as in FIG. 1.

The image 208 includes the clothing region 210 and the region of the related clothing 212. The image 208, the clothing region 210, and the region of the related clothing 212 may be similar in structure and functionality to the image 108, the clothing region 110, and the region of the related clothing 112 as in FIG. 1.

The segment module 202 obtains the region of related clothing 212 in the image 208 and the detection module 204 extracts the feature of the related clothing 212. The segment module 202 and the detection module 204 may be similar in functionality to the segment module 102 and detection module 104 as in FIG. 1.

The processor 206 includes module 214 to analyze the feature of the related clothing 212 to determine the style 216 of clothing. The processor 206 and the style 216 may be similar in structure and functionality to the processor 106 and the style 116 as in FIG. 1. The analyze module 214 may be similar in functionality to the analyze module 114 as in FIG. 1.

The recognition module 222 identifies a person in the image 208 to determine the style 216 of clothing the person is wearing in the image 208. In one embodiment, the recognition module 222 identifies the person in more than one image (i.e., image collection), and grouping together the several images of the one person. In this embodiment, there may be multiple views of the person wearing the same outfit enabling more regions of related clothing for better analysis to deliver more personalized and/or appropriate clothing recommendation 218. In one embodiment, the recognition module 222 utilizes face recognition or face clustering technology to identify the person in the image 208. For example, a facial feature may be detected within the image 208 and represented with an identifier, such as a vector or signature, to find other identifiers with the similar facial feature. Embodiments of the recognition module 222 includes an instruction, process, operation, logic, algorithm, technique, logical function, firmware and/or software the computing device 200 may fetch, decode, and/or execute to identify a person within the image 208. Although FIG. 2 depicts the man standing near the center of the image 208 as being identified, this was done for illustration purposes and not for limiting embodiments. For example, the women on either side may have been identified and their facial features and/or hair detected for identification.

The demographic data 224 may be collected by the recognition module 222 once identifying a person in the image 208. The demographic data 224 may be used to obtain and further personalize the clothing recommendation 218. For example, the clothing recommendation 218 may be different for a man and a woman. In one embodiment, the demographic data 224 is collected by extracting a facial feature from a person in the image 208 and classifying the extracted facial feature to identify and collect the demographic data 224. In another embodiment, the facial feature may be represented through an identifier to identify and collect the demographic data 224. Embodiments of the demographic data 224 may include gender, ethnicity, age group, skin tone, hair style, and/or face shape may be estimated for each person in the image collection.

The output module 220 includes the clothing recommendation 218 to deliver. In one embodiment, the output module 220 may display and/or present the clothing recommendation 218. In another embodiment, the output module 220 includes a visual display and/or audio to present the clothing recommendation 218. In a further embodiment, the output module 220 includes an instruction, process, operation, logic, algorithm, technique, logical function, firmware and/or software the computing device 200 may fetch, decode, and/or execute to deliver the clothing recommendation 218.

The clothing recommendation 218 is obtained by the processor 206 once determining the style 216. Further, the clothing recommendation 218 may be included as part of the output module 220 to deliver. The clothing recommendation 218 advises an individual what to wear that would be appropriate according to the style 216 of clothing and/or feature of the related clothing 212. Additionally, the clothing recommendation 218 may serve as a way of inducing acceptance for an individual to purchase. In one embodiment, the clothing recommendation 218 may include an accessory recommendation. This is explained in detail in the next figure. Embodiments of the clothing recommendation 218 may include an image, photograph, video, descriptions, pricing, and/or links to the article of clothing or outfit.

Figure 3:
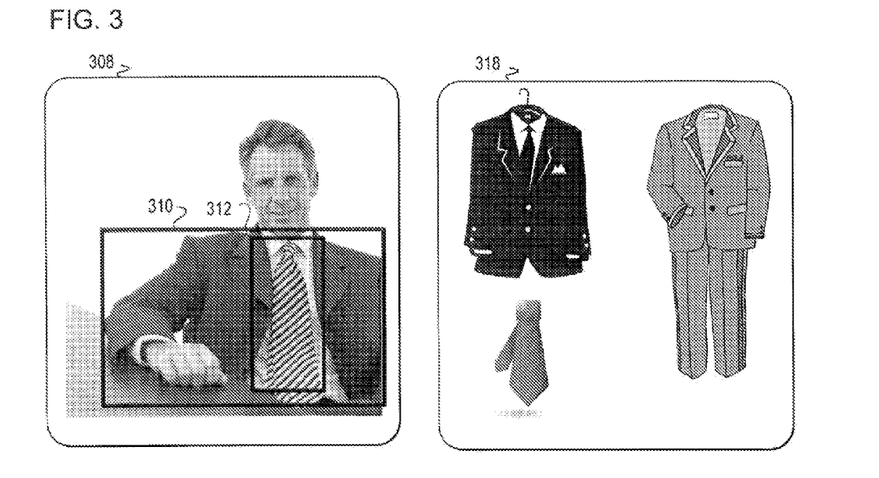
FIG. 3 is a block diagram of an example image to identify clothing with region of related clothing and to output a clothing recommendation and/or accessory recommendation.

FIG. 3 is a block diagram of an example image 308 to identify a clothing region 310 to segment into a region of related clothing 312, and to output one or more recommendations 318 including a clothing recommendation and/or accessory recommendation. The image 308, the clothing region 310, the region of related clothing 312, and recommendations 318 may be similar in structure and functionality to the image 108 and 208, the clothing region 110 and 210, region of related clothing 112 and 212, and recommendation 218 in FIGS. 1-2.

The image 308 illustrates a person (i.e. man) with the clothing region 310 including a suit jacket, collared shirt, and tie. Demographic data may be collected on this man including hair, skin tone, age and gender. The clothing region 310 is segmented into analogous areas, such as the region of related clothing 312. Although FIG. 3 depicts the striped tie as the region of related clothing 312, this was done for illustration purposes rather than for limiting embodiments. For example, the region of related clothing 312 may include the suit jacket and/or the collared shirt.

Once obtaining the region of the related clothing 312, a feature of the region of the related clothing 312 is detected. Although the feature of the related clothing region 312 may include the tie, stripes, the texture of the tie, and/or the color of the tie this was done for illustration purposes rather than for limiting embodiments. For example, if the region of the related clothing 312 included the collared shirt, the feature may be the collar of the shirt, buttons on the shirt, sleeves on the shirt, etc.

Once the feature of the related clothing region 312 is detected, the feature is used to determine the style of the clothing within the region of related clothing 312. In this figure, the feature (i.e., the tie) indicates the style of clothing within region 312 is business attire. Thus the recommendations 318 are delivered and presented based on the business attire. The clothing recommendations 318 include the jacket with the shirt and the suit, while the accessory recommendation 318 includes the tie. In one embodiment, the style of the clothing may be associated with metadata, thus the recommendations 318 may be obtained by identifying the metadata that corresponds to the style of clothing. These recommendations 318 are based on the style of the clothing (i.e., business) and/or the demographic data to allow more personalized recommendations 318.

Figure 4:
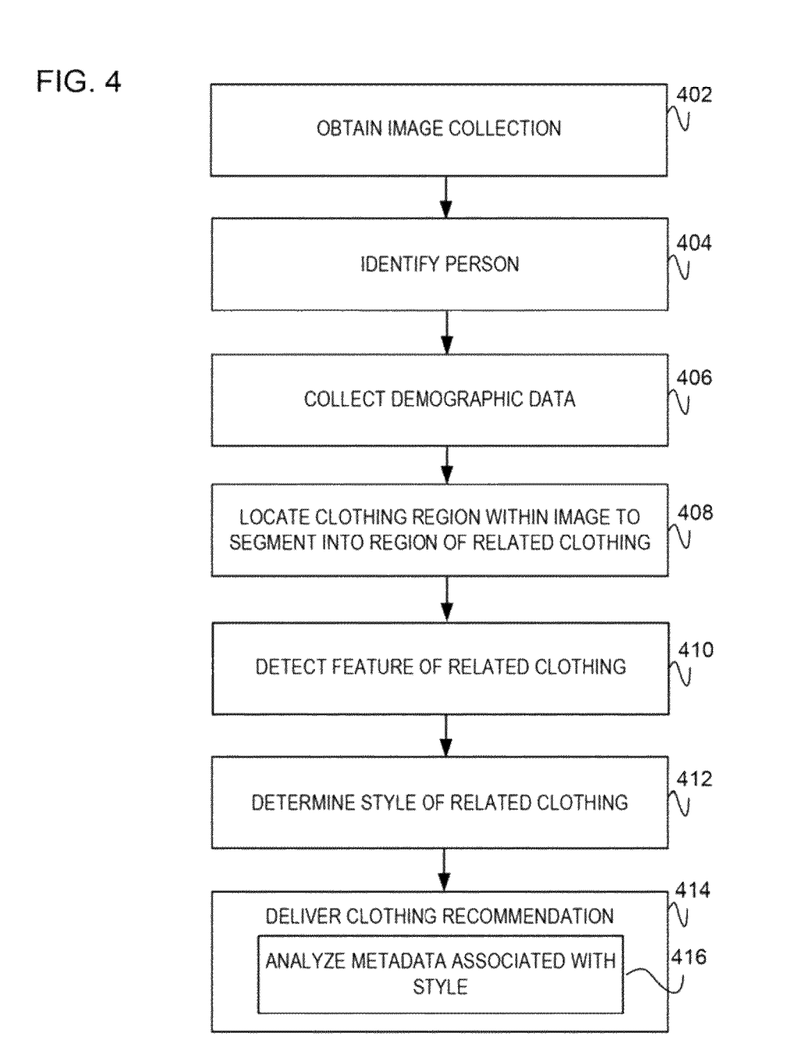
FIG. 4 is a flowchart of an example method to obtain an image collection and deliver a clothing recommendation based on a detected feature of related clothing and/or demographic data of a person in the image collection.

FIG. 4 is a flowchart of an example method performed on a computing device to obtain an image collection, identify a person in the image collection, and deliver a clothing recommendation based on a detected feature of related clothing the person is wearing. Although FIG. 4 is described as being performed on a computing device, it may also be executed on other suitable components as will be apparent to those skilled in the art. For example, FIG. 4 may be implemented in the form of executable instructions on processor 106 and 206 as in FIGS. 1-2.

At operation 402 the computing device obtains an image collection. The image collection includes two or more images which allow analysis of these images to deliver a clothing recommendation. In this embodiment, the computing device may obtain two or more images to identify a person from the images and find the related clothing in the images.

At operation 404 the computing device identifies a person in the image collection obtained at operation 402. In one embodiment of operation 404, facial recognition technology is utilized to cluster or group together photos of the same person. In this embodiment, the person may be wearing the same outfit from multiple images, thus a clothes matching algorithm may be utilized to group together the same outfit for analysis. In another embodiment, operation 404 may use facial analysis to extract facial features which are represented with an identifier and similar identifiers are grouped together to identify the person. In a further embodiment, operation 404 identifies the person in an image collection in order to cluster the clothes the person is wearing together for analysis.

At operation 406 demographic data is collected from the person identified in the images at operation 404. In one embodiment, the demographic data collected at operation 406 is used to further recommend appropriate clothing and/or accessories at operation 414. The demographic data may be collected for each person in the image(s). Embodiments of the demographic data collected at operation 406 includes gender, ethnicity, age group, skin tone, hair style, and/or face shape which may be estimated for each person in the image collection obtained at operation 402.

At operation 408, the clothing region is located within the image and segmented into a region of related clothing. At operation 408, the clothing region is partitioned into segments of similarities according to color, texture, piece of clothing, etc., the person identified at operation 404 is wearing. For example, a red jacket with black pants, the region including the red jacket would be partitioned together while the black pants would be included in another segment. Partitioning the image into the segments simplifies and/or changes the representation of the image so it may be further analyzed. In keeping with the previous example, each segment (i.e., the red jacket and the black pants) may be assigned metadata to the color pixels so other pixels associated with this metadata may be compared and grouped together. In one embodiment, operation 408, detects the head of a person identified at operation 404 and locates the clothing region as below the head of the person. In another embodiment, the clothing region is detected within the image.

At operation 410 a feature of the related clothing is detected, the related clothing segmented into the region at operation 408. Detecting the feature of the related clothing, the style of the clothing may be determined at operation 412. Further, detecting the feature of the related clothing at operation 410 detects whether the clothing may be casual as opposed to business, etc. Embodiments of operation 410 include vector analysis, statistical modeling, histogram modeling, extraction, filtering algorithm, rule-based algorithm, logic-based algorithm, classification algorithm, or other type of representation analysis to detect the feature of the related clothing.

At operation 412 the style of the related clothing segmented at operation 408 is determined based on the feature of the related clothing detected at operation 410. In one embodiment, the styles may be defined so each style (i.e., business, casual, athletic, etc.) is associated with one or more features. For example, the feature of a collared shirt in the image may determine the style is business or business casual. The style of the related clothing is determined so a clothing recommendation may be delivered at operation 414. In another embodiment, the style is associated with metadata so each recommendation may include corresponding metadata to identify the appropriate recommendation to deliver. In a further embodiment, the demographic data collected at operation 406 helps further personalize the recommendations. For example, a 70-year old person may prefer clothing and/or accessory recommendations from a different merchant than a 15 year old person.

At operation 414 a clothing recommendation is delivered based on the style of the clothing determined at operation 412. Operation 414 may include displaying, presenting, outputting, and/or audio of the clothing recommendation. For example, this may include presenting images of the recommendation with pricing information and other such details. In one embodiment, the clothing recommendation is further based on the detected feature of the related clothing at operation 410 and/or the demographic data collected at operation 406. In another embodiment, operation 412 includes delivering an accessory recommendation. The accessory recommendation is to compliment and/or contribute to clothing worn by the person in the image. Embodiments of the accessory recommendation may include shoes, jewelry, socks, bags, glasses, hats, pins, umbrellas, belts, gloves, scarves, etc. The clothing and/or accessory recommendation may be connected with merchants, so the demographic data collected at operation 406 may be utilized to narrow the merchants and/or recommendations. For example, the demographic data collected may include a male, thus this would be used to narrow the merchants specializing in men's wear and/or accessories to obtain the recommendations. In this embodiment, the recommendations may also be associated with metadata to determine the appropriate recommendations to deliver based on the demographic data. In a further embodiment, operation 414 obtains the clothing recommendation from a database of merchants' clothing and/or accessories. In this embodiment, the merchant may include a database with recommendations organized by style and each associated with metadata identifying the style of each recommendation. Recommendations with the similar style, features, and/or demographic data may be grouped together, thus the most similar recommendations according to the style, features and/or demographic data may be delivered. Yet, in a further embodiment, the metadata associated with the style of the related clothing at operation 412 is analyzed to deliver the clothing recommendation as at operation 416. For example, the clothing and/or accessory recommendations may be provided through catalogs and/or brochures with images, descriptions, and pricing information for delivery to the individual. In a further example, the clothing and/or accessory recommendations are provided on a web page with images, descriptions and/or pricing information based on login information. Yet, in a further example, the recommendations are displayed on a mobile device, such as a mobile phone with images, descriptions and/or pricing information. Further still, in another example, clothing and/or accessory recommendations may be transmitted from local retailers to the mobile device based on the location of the mobile device.

At operation 416 metadata associated with the style of clothing is analyzed. In this embodiment, analyzing the metadata allows clothing and/or accessories in a database to be obtained according to the style.

Figure 5:
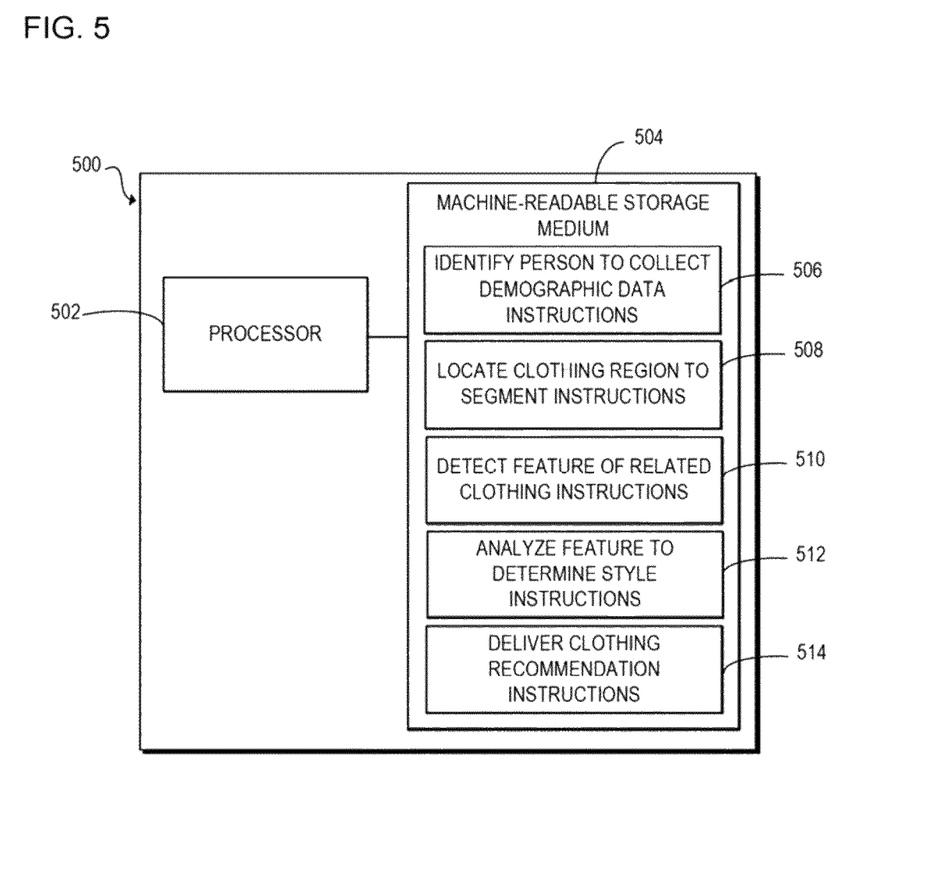
FIG. 5 is a block diagram of an example computing device to identify a person in an image, collect demographic data of the person, and deliver a clothing recommendation.

FIG. 5 is a block diagram of an example computing device 500 to identify a person in an image to collect demographic data and detect a feature of the clothing associated with the person in the image to deliver a clothing recommendation. Although the computing device 500 includes processor 502 and machine-readable storage medium 504, it may also include other components that would be suitable to one skilled in the art. For example, the computing device 500 may include an output module 220 as in FIG. 2. Additionally, the computing device 500 may include the structure and functionality of the computing devices 100 and 200 as set forth above in FIGS. 1-2.

The processor 502 may fetch, decode, and execute instructions 506, 508, 510, 512, and 514. The processor 502 may be similar in structure and functionality to the processor 106 and 206 as in FIGS. 1-2. The processor 502 executes instructions to: identify a person to collect demographic data instructions 506, locate a clothing region to segment into a region of related clothing instructions 508, detect a feature of the related clothing instructions 510, analyze the feature to determine a style of the related clothing instructions 512, and deliver a clothing recommendation instructions 514.

The machine-readable storage medium 504 may include instructions 506-514 for the processor 502 to fetch, decode, and execute. The machine-readable storage medium 504 may be an electronic, magnetic, optical, memory, flash-drive, or other physical device that contains or stores executable instructions. Thus, the machine-readable storage medium 504 may include for example, Random Access Memory (RAM), an Electrically Erasable Programmable Read-Only memory (EEPROM), a storage drive, a memory cache, network storage, a Compact Disc Read Only Memory (CD-ROM) and the like. As such, the machine-readable storage medium 504 can include an application and/or firmware which can be utilized independently and/or in conjunction with the processor 502 to fetch, decode, and/or execute instructions on the machine-readable storage medium 504. The application and/or firmware can be stored on the machine-readable storage medium 504 and/or stored on another location of the computing device 500.

In summary, examples disclosed herein provide a more personalized experience for individuals to obtain a clothing recommendation. Further, utilizing demographic data enables appropriate recommendations, thus creating a more efficient shopping experience.

We claim:

1. A computing device comprising:
    a segment module to obtain a region of related clothing with an image;
    a detection module to ascertain a feature of the related clothing within the region;
    a recognition module to:
        identify a person associated with the region of the related clothing within the image; and
        collect demographic data of the person; and
    a processor to analyze the feature of the related clothing and the collected demographic data to determine a style of the related clothing based on the ascertained feature and the collected demographic data.

2. The computing device of claim 1 wherein the processor is further to:
    obtain a clothing recommendation based on the demographic data and the style of the related clothing; and
    output the clothing recommendation.

3. The computing device of claim 1 wherein:
    the segment module is further to assign a pixel within the region of related clothing; and
    the detection module is further to analyze the pixel to ascertain the feature of the related clothing.

4. The computing device of claim 1 wherein the feature of the related clothing is represented with an identifier and the processor is further to analyze the identifier to determine the style of the related clothing.

5. A method executed on a computing device comprising:
    locating a clothing region within an image to segment into a region of related clothing;
    detecting a feature of the related clothing in the region;
    collecting demographic data of a person associated with the region of the related clothing within the image; and
    determining a style of the related clothing in the region based on the detection of the clothing feature and the collected demographic data of the person.

6. The method of claim 5 further comprising:
    delivering at least one of a clothing recommendation and an accessory recommendation based on the style of the related clothing.

7. The method of claim 6 wherein the style of the related clothing is associated with metadata and delivering the clothing recommendation is further comprising:
    analyzing the metadata associated with the style of the related clothing.

8. The method of claim 5 further comprising:
    obtaining an image collection, the image as part of the image collection; and
    identifying the person within the image collection to determine the style of related clothing associated with the person.

9. The method of claim 8 further comprising:
    delivering a clothing recommendation based on the demographic data and the style of the related clothing.

10. The method of claim 5 wherein locating the clothing region within the image is further comprising:
    identifying the person within the image to segment clothing associated with the person into the region of related clothing.

11. The method of claim 5 wherein:
    the feature of the related clothing includes at least one of: a button, a neckline, color, texture, collar, sleeves, length, and a zipper; and
    the clothing style includes at least one of: business, casual, and athletic.

12. A non-transitory machine-readable storage medium encoded with instructions executable by a processor of a computing device, the storage medium comprising instructions to:
    locate a clothing region in an image to segment the image into a region of related clothing;
    detect a feature of the related clothing in the region;
    collect demographic data of a person associated with the region of related clothing in the image; and
    analyze the feature of the related clothing and the collected demographic data to determine a style of the related clothing.

13. The non-transitory machine-readable storage medium of claim 12 further comprising instructions to:
    obtain multiple images;
    identify the person from the multiple images to collect the demographic data of the person; and
    deliver a clothing recommendation based on the demographic data and the style of the related clothing.

14. The non-transitory machine-readable storage medium including the instructions of claim 13, wherein the style of clothing is associated with metadata to identify the clothing recommendation with corresponding metadata.

15. The computing device of claim 1 wherein the recognition module is further to:
    extract a facial feature of the person in the image for collecting the demographic data.

16. The computing device of claim 1 wherein the recognition module is further:
    obtain multiple images for identifying the person among the multiple images; and
    collect the demographic data of the person from among the multiple images.

17. The method of claim 5 wherein locating the clothing region with the image includes:
    detecting a head of the person identified in the image; and
    locating the clothing region below the head of the person.

* * * * *